United States Patent [19]

Iyeta

[11] 4,039,195
[45] Aug. 2, 1977

[54] PICKUP ARM DRIVING DEVICE IN LINEAR TRACKING PICKUP APPARATUS

[75] Inventor: Motoi Iyeta, Hamakita, Japan

[73] Assignee: Nippon Gakki Seizo Kabushiki Kaisha, Hamamatsu, Japan

[21] Appl. No.: 597,904

[22] Filed: July 21, 1975

[30] Foreign Application Priority Data

| | | |
|---|---|---|
| July 25, 1974 | Japan | 49-85321 |
| July 25, 1974 | Japan | 49-91093 |
| Aug. 8, 1974 | Japan | 49-91382 |
| July 26, 1974 | Japan | 49-88991 |

[51] Int. Cl.² ............................................. G11B 3/12
[52] U.S. Cl. .............................................. 274/23 A
[58] Field of Search .................................. 274/23 A

[56] References Cited

U.S. PATENT DOCUMENTS

| | | | |
|---|---|---|---|
| 3,321,766 | 5/1967 | Everest | 346/32 |
| 3,572,724 | 3/1971 | Rabinow | 274/23 A |
| 3,675,932 | 7/1972 | Rabinow | 274/23 A |

FOREIGN PATENT DOCUMENTS

| | | | |
|---|---|---|---|
| 1,060,103 | 2/1967 | United Kingdom | 274/23 A |
| 1,361,610 | 7/1974 | United Kingdom | 274/23 A |

*Primary Examiner*—Charles E. Phillips
*Attorney, Agent, or Firm*—Cushman, Darby & Cushman

[57] ABSTRACT

A pickup arm driving device in a linear tracking apparatus. The offset angle of the pickup arm is photoelectrically detected to produce a corresponding offset angle signal for driving a motor to move the pickup arm. Completion of the reproduction of sound from a disc causes a groove end detection signal which operates an electromagnetic lifter causing upward swinging of the pickup arm and a quick return of the pickup arm to an arm rest position.

18 Claims, 11 Drawing Figures

PICKUP ARM DRIVING DEVICE IN LINEAR TRACKING PICKUP APPARATUS

BACKGROUND OF THE INVENTION

1. Field of the Invention

The present invention is concerned with a driving device for driving a pickup arm in a linear tracking pickup apparatus which is used for the reproduction of recorded sound or video of a phonograph disc or video disc.

2. Brief Description of the Prior Art

As a pickup device or apparatus which completely eliminates the development of lateral tracking errors and inside forces, there has been proposed and put into practice the so-called linear tracking pickup device or apparatus.

In such a linear tracking pickup device, the pickup arm is adapted to be moved linearly radially of a phonographic disc or video disc while being held tangential relative to the signal-carrying groove of a phonographic disc or video disc. Accordingly, the sensor lever of the pickup head which is mounted at the foremost end of the pickup arm assumes a position which is tangential relative to the disc as in the case of a disc cutting machine. Since the virbration axis of the pickup head is in agreement with the vibration axis of the groove, the signal which has been recorded on this groove can be faithfully reproduced and the damage of the groove can be minimized.

The greatest technical difficulty in this known linear tracking pickup device or apparatus is found in how to construct the driving device for moving the pickup arm toward the center of the disc progressively in accordance with the turning of the disc while keeping this arm tangential relative to the signal-carrying groove of the disc. An arrangement that the pickup arm is merely held for movement radially of the disc and that the arm is moved directly by the force applied to the stylus of the pickup head from one side of the wall surfaces of the signal-carrying groove of the disc in accordance with the turning of the disc cannot be adopted because an unduly great pressure is applied to one side of the wall surfaces of the groove.

Thus, the pickup arm driving device of this type is, in general, has a motor exclusively for driving a pickup arm, and is operative so that the pickup arm is adapted to swing in the direction of the center of the disc; that, whenever the pickup arm is offset for a trifle angle $\Delta\theta$ from the tangential direction of the signal-carrying groove of the disc and whenever any tracking error develops, the motive force of the arm drive motor is transmitted to a supporting member which supports the base end of the pickup arm to move this supporting member linearly radially of the disc for such a distance as is necessary for cancelling the offset angle $\Delta\theta$.

However, many of the known pickup arm driving devices are comprised of the so-called mechanical servo mechanism in which the offset angle $\Delta\theta$ of the pickup arm is purely mechanically detected and the motive power of the arm drive motor is also mechanically transmitted to the supporting member which supports the base end of the pickup arm. Thus, the driving device of the pickup arm is quite complicated in its arrangement.

Since a pickup arm forms, together with a pickup head, a vibration system, it will be understood that the coupling of a mechanical servo mechanism having such a complicated arrangement and such a great mechanical inertia as mentioned above to a pickup arm is not desirable because this coupling will tend to adversely affect the sound characteristics and to develop noises, deteriorating a signal-noise ratio of such a pickup apparatus.

Also, a pickup arm driving device is required to satisfy a number of driving modes which include: in addition to automatic feeding of the pickup arm at the time of reproduction of the signal recorded on a disc, (a) stopping of feed of the pickup arm in the midst of this reproduction; (b) manually controlled feeding of the pickup arm to an arbitrary position on the disc; and (c) automatic or manually controlled quick returning of the pickup arm upon completion of the reproduction.

In the aforesaid mechanical servo mechanism, however, the structural components thereof are mechanically coupled to each other, and the mechanical inertia of the mechanism is great. Thus, a great difficulty is encountered in materializing a pickup arm driving device which can satisfy such various driving modes as discussed above. For these reasons, in some of the known pickup arm driving devices, there are adopted desperate countermeasures of, for example, additionally providing an electric motor exclusively for performing quick return of the pickup arm. Thus, the structure of the driving device is all the more complicated and increases in size.

SUMMARY OF THE INVENTION

It is, therefore, a general object of the present invention to provide a pickup arm driving device for a linear tracking arm apparatus, which greatly improves the drawbacks of the prior art described above.

A primary object of the present invention is to provide a pickup arm driving device described above, which can easily materialize with a simplified structure any one or all of the functions which include, in addition to the automatic linear normal feeding of the pickup arm by a single motor, manually controlled feeding of the pickup arm; automatic stopping of the feed of the pickup arm upon completion of the reproduction of the signal which is carried on a disc; and automatic quick returning of the pickup arm to its initial rest position.

Another object of the present invention is to provide a pickup arm driving device described above, which can unfailingly detect the completion of the reproduction of the recorded signal of the disc and can quickly and automatically return the pickup arm to its initial rest position.

Still another object of the present invention is to provide a pickup arm driving device described above, which is free of causing damages of the disc at the time of the automatic quick returning of this pickup arm.

A further object of the present invention is to provide a pickup arm driving device described above, which detects an offset angle of the pickup arm with a high sensitivity and extremely minimizes any offset angle, i.e. lateral tracking error, of the pickup arm during the reproduction of the signal of the disc.

Still further object of the present invention is to provide a pickup arm driving device described above, which is such that the mechanical load applied to the pickup arm is extremely small and that no noise is developed during the movement of the pickup arm.

These and other objects as well as the aimed advantages of the present invention will become apparent by reading the following detailed description when taken in conjunction with the accompanying drawings.

BRIEF DESCRIPTION OF THE DRAWINGS

FIG. 3 is a chart showing the voltage-rotation speed characteristic of the motor for driving the pickup arm.

Like parts are indicated by like reference numerals and symbols throughout the drawings for the simplicity of explanation.

DETAILED DESCRIPTION OF THE PREFERRED EMBODIMENTS

Figure 1:
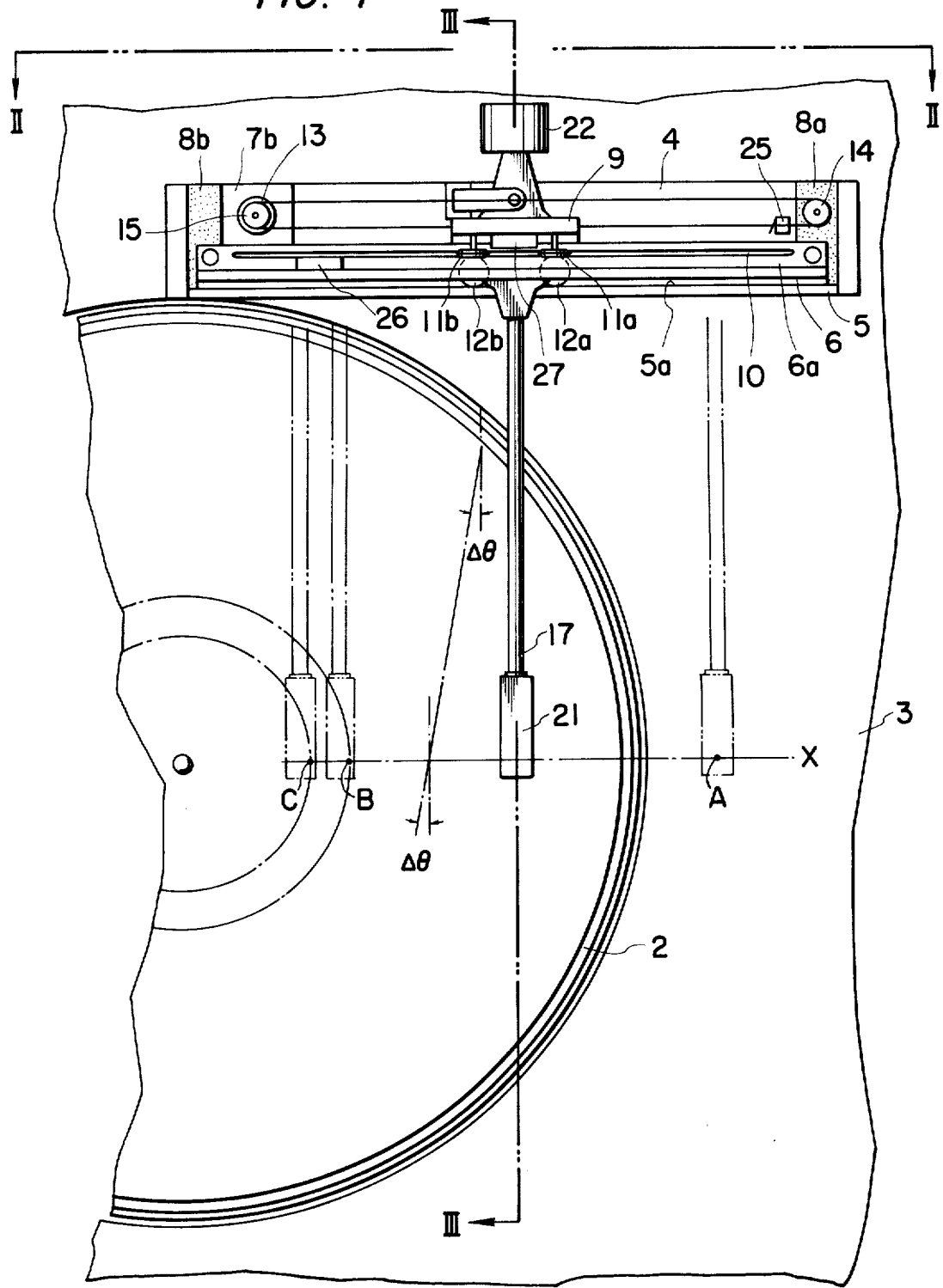
FIG. 1 is a plan view of a linear tracking pickup apparatus having the pickup arm driving device of the present invention, excluding its electrical circuitry.
Figure 2:
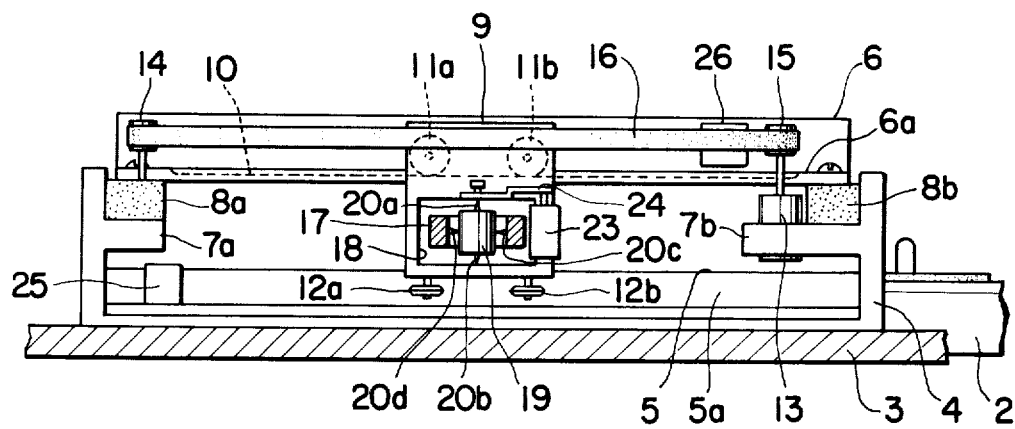
FIG. 2 is a sectional view taken along the line II—II in FIG. 1.
Figure 3:
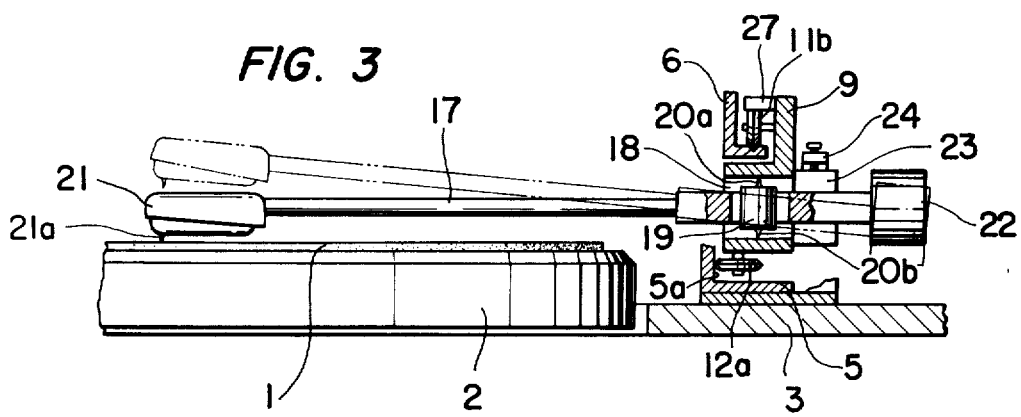
FIG. 3 is a sectional view taken along the line III—III in FIG. 1.

Referring now to FIGS. 1, 2 and 3, description will hereunder be made mainly on the feeding mechanism.

On one side of a base plate 3 which is mounted a platter or turntable 2 which carries a disc or disc record 1 and which is adapted to be turned at a constant speed, there is provided a fixed frame 4 in parallel relation with the radial direction of the disc 1. A first guide rail 5 having a substantially L-shaped cross section is fixed to the bottom wall of the fixed frame 4. A second guide rail 6 having a substantially L-shaped cross section is fixed at its opposite ends to supporting lugs 7a and 7b projecting inwardly from the opposite walls of the fixed frame 4. Between the second guide rail 6 and the supporting lugs 7a and 7b are inserted cushion members 8a and 8b made with a soft elastic material such as a soft rubber. Owing to the cushioning action of these cushion members 8a and 8b, the development of resonance between the first and second guide rails 5 and 6 and the fixed frame 4 can be suppressed.

A movable frame or pickup arm supporting mechanism 9 is supported on support means including the first and second guide rails 5 and 6 by means of rollers 11a and 11b which are rotatable while engaging in a guide groove 10 formed on a flat horizontal surface 6a of the second guide rail 6 and also by rollers 12a and 12b which are rotatable while being in contact with the vertical surface 5a of the first guide rail 5. The movable frame 9 is guided by these first and second guide rails 5 and 6 for free linear movement radially of the disc 1.

An arm drive motor 13 is attached to one lug 7b of the supporting lugs of the fixed frame 4. A pulley 14 is rotatably attached to the other one 7a of the supporting lugs of the frame 4. Both ends of a belt 16 which is applied between this pulley 14 and a pulley 15 secured to the rotary shaft of the drive motor 13 are coupled to the movable frame 9. This movable frame 9 is caused to move linearly radially of the disc 1 along the first and the second guide rail 5 and 6 in accordance with the forward or reverse rotation of the drive motor 13, i.e., the rotation force of motor 13 is converted to a linear movement force and transmitted to the movable frame or supporting mechanism 9 by motive power transmitting means such as the belt and pulley arrangement 14, 15, 16.

Figure 4:
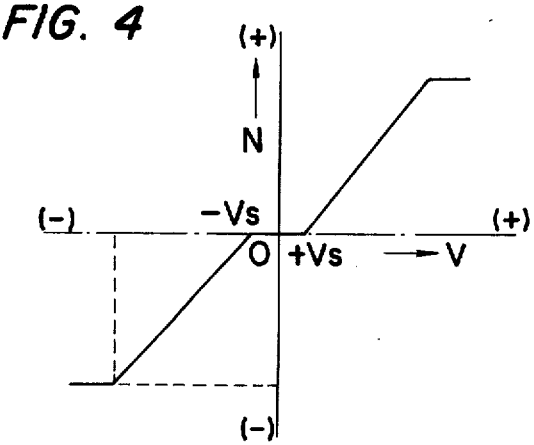

As the drive motor 13, a direct current motor having an applied voltage(V)-rotation speed(N) characteristic as shown in FIG. 4 is used. This driving motor 13 desirably satisfies the following parameters. They are: a small starting voltage Vs; a starting torque of at least 0.5 - 1.0 g.cm; and a maximum rotation speed to minimum rotation speed ratio of 100 or more.

On the movable frame 9, the pickup arm 17 is supported at its base portion by a known gimbal support mechanism so as to be freely swingable both vertically and horizontally. In further detail, a block 19 is supported, within an aperture 18 formed substantially centrally of the movable frame 9 for free horizontal swinging movement, by a pair of pivots 20a and 20b. The pickup arm 17 is supported on the block 19 for free vertical swinging movement by another pair of pivots 20c and 20d. The pickup arm 17 has, at one end, a pickup head 21 provided with a pickup stylus 21a and, at the other end, a counter weight 22.

An electrically actuatable arm lifter 23 is attached to the rear side of the movable frame 9 to lift upwardly the foremost end, i.e. the pickup head 21 of the pickup arm 17. This arm lifter 23 is of any known type and has a plunger and an electromagnetic solenoid for actuating this plunger. A viscous fluid may be enclosed within the lifter for braking the forward as well as backward movement of the plunger. And, the tip of a pressing plate 24 which is secured to the plunger of the arm lifter 23 is positioned above the end portion of the pickup arm so as to face the latter. When the pickup arm 17 is in its lifted-up position due to the action of the arm lifter 23, this pickup arm 17 is regulated in its horizontal position so as to cross, at a right angle, the first as well as the second guide rails 5 and 6 by a direction-regulating member not shown which is provided on, for example, the supporting aperture 18 of the movable frame 9.

A micro-switch 25 and a reed switch 26 are provided on the first and second guide rails, respectively, for detecting the fact that the pickup arm 17 is in a specific position.

The micro-switch 25 makes and breaks depending on the contact and release of its actuator with and from the movable frame 9, thereby detecting whether the pickup arm 17 is located in the position of the arm rest or is located in other positions. The reed switch 26 makes and breaks depending on the polarity of the magnetic field of a permanent magnet 27 which is provided in the foreground of the movable member 9, thereby detecting whether the pickup arm 17 is located within the space range between the position B and the position C, as are indicated by dot-and-dash lines in FIG. 1. The position B is at the distance of 106.4 mm/2 from the spindle of the platter 2, i.e. from the center of the disc 1. This distance corresponds to the distance between the center of a disc of 30 cm (about 12 inches) in diameter and the extreme end of the signal carrying groove of the disc.

The position C is at the distance of 97 mm/2 from the spindle of the platter 2, and this distance is equivalent to the distance between the center of a disc of 17 cm (about 7 inches) in diameter and the extreme end of the lead-out groove.

Next, description will be made on an example of the offset angle detector for detecting the offset angle assumed by the pickup arm 17, by referring to FIG. 5. This offset angle detector is composed of: a luminescent diode 28 which serves as the light-emitting source; a slit-carrying plate 30 having a slit 30a; and a photo-electricity converting element 29 which receives the beam of light irradiated from the light-emitting diode 28 and passing through the slit 30a. Diode 28 and plate 30 comprise an angle optical converting means as will be more evident below. Both the light-emitting diode 28 and the photo-electricity converting element 29 are fixed, by an appropriate fastening means, to the movable frame 9. The slit-carrying plate 30, on the other hand, is attached to the block 19 and is swingable horizontally together with the pickup arm 17. In other words, the slit-carrying plate 30 is allowed to rotate only for an angle equal to the offset angle $\Delta\theta$ which is assumed by the pickup arm 17. Accordingly, the position of incidence of the beam of light impinging onto the photo-electricity converting element 29 after passing through the slit 30a of the plate 30 corresponds to the offset angle $\Delta\theta$ assumed by the pickup arm 17.

Figure 6A:
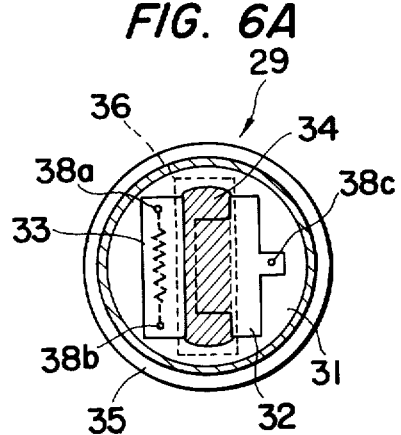
FIGS. 6A, 6B and 6C are a cross sectional view, a vertical sectional view and an equivalent electrical circuit diagram, respectively, of the photo-electricity converting element which is employed in the above-mentioned offset angle detector.
Figure 6B:
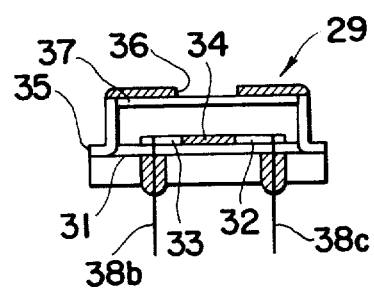

The photo-electricity converting element 29 has a structure shown in FIGS. 6A and 6B. On the upper face of an insulating plate 31 which is enclosed within a casing 35 are formed a conductive electrode 32 and a thin film resistor 33 so as to be positioned close to each other by, for example, an evaporation-deposition technique. Between this electrode 32 and the thin film resistor 33 is stuffed a photoconductive material 34 such as selenium or cadmium sulfide. On the upper face of the casing 35 is formed a slit 36 which is covered on one surface by a transparent glass plate 37. This slit 36 is positioned so as to face the photoconductive element 34. Leads 38a and 38b from the opposite ends of the thin film resistor 33 and the lead 38c of the electrode 32 extend to the outside of the casing 35.

Figure 6C:
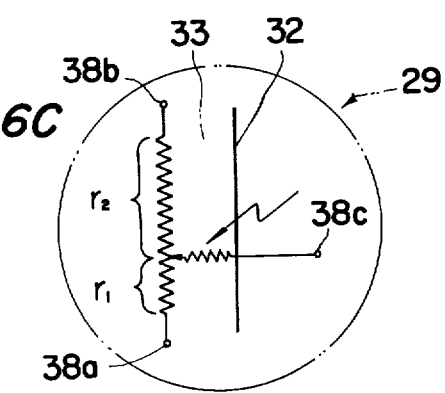

The aforesaid photo-electricity converting element 29 is such that, whenever a beam of light impinges onto this element 29 after passing through the slit 36, the electric resistance of that portion of the photoconductive element 34 to which the beam of light impinges will have a very low value. Owing to this low resistance value, there substantially takes place a short circuiting between the thin film resistor 33 and the conductive electrode 31 at the position where the beam of light has impinged to the photoconductive element. In other words, this photo-electricity converting element 29 may be regarded as a sort of potentiometer whose slider tap moves in correspondence with the position of incidence of the light beam. Thus, this element 29 may be expressed by the equivalent electrical circuit shown in FIG. 6C.

As such, by arranging this photo-electricity converting element 29 in such a way that its slit 36 will substantially cross at right angle the slit 30a of the slit-carrying plate 30, the ratio between the electrical resistance $r_1$ between the lead 38a and the lead 38c and the electrical resistance $r_2$ between the lead 38b and the lead 38c will vary in correspondence with the offset angle $\Delta\theta$ assumed by the pickup arm 17. And, since this photo-electricity converting element 29 is designed so as to detect the magnitude of the offset angle $\Delta\theta$ of the pickup arm 17 for the ratio $r_1/r_2$ and not for the absolute value of the electrical resistance between the leads 38a and 38b, the photo-electricity converting element 29 has the advantage that it is not easily affected by the external light which is incident to the entire element 29 or by the varing intensity of illumination of the light-emitting diode 28. It should be understood that, as the photo-electricity converting element 29, it is possible to use a known device such as a photo-resistor and a photo-transistor. In the event that these devices are used, it is only necessary to modify the structure of the slit-carrying plate 30 so as to vary the amount of light incident to the photo-electricity converting element 29 in correspondence with the offset angle $\Delta\theta$ of the pickup arm 17.

It should further be understood that means for varying the electrical resistances between the leads 38a and 38c and between the leads 38b and 38c is not limited to the slit 36 but that any other suitable light-converging means may be used instead thereto.

Figure 7:
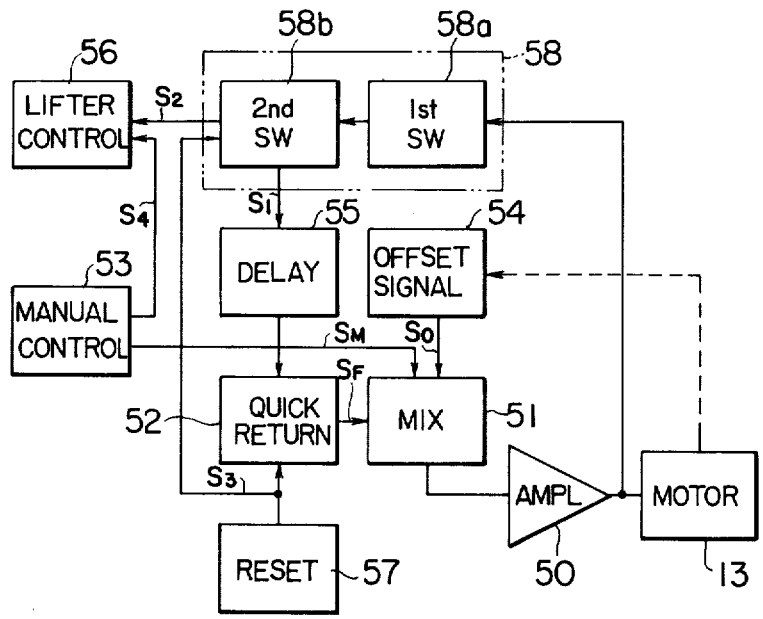
FIG. 7 is a block diagram showing an example of the electrical circuitry of the pickup arm driving device of the present invention.

FIG. 7 shows an example of the electrical circuit of the pickup arm driving device of the present invention. This electrical circuit is comprised of: a servo amplifier 50; a mixing circuit 51; a quick return signal generating circuit 52; a manual control signal generating circuit 53; an offset signal generating circuit 54; a delay circuit 55; a lifter control circuit 56; a reset circuit 57; and a signal groove end detecting circuit 58.

Figure 5:
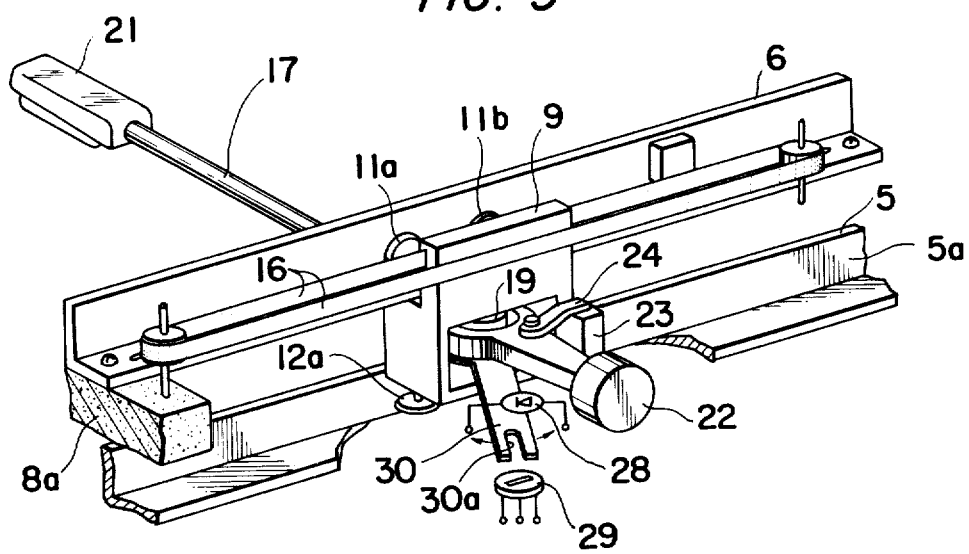
FIG. 5 is a perspective view, partly broken away, of the detector for detecting the offset angle of the pickup arm in the pickup arm driving device of the present invention.
Figure 8:
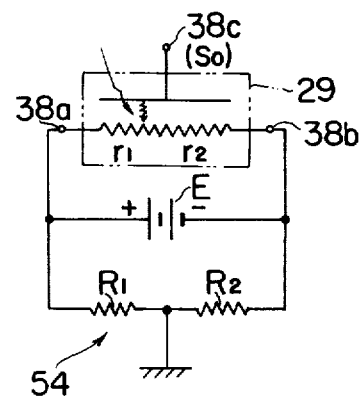
FIG. 8 is a circuit diagram showing an example of the offset angle signal generating circuit.

The offset signal generating circuit 54 generates an offset signal $S_0$ having a value and a polarity corresponding to the magnitude and the direction of the offset angle $\Delta\theta$ of the pickup arm 17 which are detected by the offset angle detector (see FIG. 5). This offset signal generating circuit 54 is comprised of, for example, a bridge circuit, as shown in FIG. 8, which is formed with the above-mentioned photo-electricity converting element 29 and resistors R1 and R2. In case the pickup arm 17 crosses record disc 1 at a right angle to the first and the second guide rails 5 and 6 so that the offset angle of the pickup arm 17 is kept zero, a beam of light from the light-emitting diode 28 impinges onto the central portion of the photoconductive element 34. Thus, the resistance value of the resistor $r_1$ becomes equal to the resistance value of the resistor $r_2$. Accordingly, the bridge circuit is rendered to its balanced state. As a result, the voltage of the direct current source E does not appear at the lead 38c of the photo-electricity converting element 29, i.e. at the output terminal of the offset signal generating circuit 54. It is, however, assumed that the resistance value of the resistor R1 is equal to the resistance value of the resistor R2. On the other hand, as the pickup arm 17 swings toward the center of the disc 1, developing an offset angle $\Delta\theta$ in the forward direction, the beam of light will impinge onto that portion of the photo-conductive element 34 of the photo-electricity converting element 29 which is located closer to the lead 38a, thereby decreasing the resistance value of the resistor $r_1$. The resistance value of the resistor $r_2$ will increase for the amount of decrease in the resistance value of the resistor $r_1$. As a result, the balanced state of the bridge circuit becomes destroyed. Thus, a positive direct current voltage which is proportional to the magnitude of the offset angle $\Delta\theta$ will appear at the lead 38c of the photo-electricity converting element 29.

The signal groove end detecting circuit 58 is comprised of: a first switching circuit 58a which is adapted to be rendered conductive whenever the output of the servo amplifier circuit 50 exceeds its preset level; and a second switching circuit 58b which is adapted to be rendered conductive whenever the reed switch 26 is closed. When the two switching circuits 58a and 58b are rendered conductive, there are generated signal groove end detection signals S1 and S2.

The quick return signal generating circuit 52 will, upon its receipt of the signal groove end detection signal S1, continue to generate a quick return signal SF until a reset signal S3 is generated from the reset circuit 57. This quick return signal SF is a direct current voltage of negative polarity having a value which is necessary for rotating the motor 13 in reverse direction at a high speed.

The reset circuit 57 generates a reset signal S3 only during the period of time in which the microswitch 25 is closed. Upon generation of this reset signal S3, both the quick return signal generating circuit 52 and the signal groove end detecting circuit 58 are reset, and the delivery of the quick return signal SF and the signal groove end detection signals S1 and S2 ceases.

The manual control signal generating circuit 53 is actuated only when the pickup arm 17 is fed under manual control. This circuit 53 generates a manual control feed signal SM which is adapted to be adjustable of its own polarity and value, and a lifter control signal S4.

Description will hereunder be directed to the operation of the pickup arm driving device of the present invention explained above.

Let us now assume that the pickup arm 17 is placed on the arm rest not shown at position A in FIG. I. When, in such a state of the pickup arm 17, the manual control signal generating circuit 53 is actuated to generate a lifter control signal S4 and a forward-oriented manual control feed signal SM, the lifter control circuit 56 energizes the arm lifter 23 so that the pickup arm 17 is swung upwardly and the motor 13 is caused to make forward rotation. As a result, the movable frame 9 is caused to move toward the center of the disc 1. At such a time, the pickup arm 17 is held, by the aforesaid swinging movement regulating member, in a position which is at right angle relative to the first and the second guide rails 5 and 6. As such, the offset signal SO is nil. Thus, when the pickup arm 17 has arrived at a required position above the disc 1, say above the lead-in groove of the disc 1, the user stops the actuation of the manual control signal generating circuit 53. Whereupon, the arm lifter 23 is deenergised. Along with this, the plunger of the arm lifter 23 starts its gentle upward movement while being subjected to the braking action of the viscous fluid, if any, contained within the arm lifter. As a result, the foremost end of the pickup arm 17 is gently lowered onto the surface of the disc 1, and the reproduction of the signal carried on the disc 1 is started.

Thereafter, by the feedback system of: offset angle detector 28–30 — offset signal generating circuit 54 — servo amplifier 50 — motor 13, the pickup arm 17 is automatically fed toward the center of the disc 1 progressively in accordance with the rotation of this disc, while its offset angle Δθ maintained at substantially zero value. More specifically, when the pickup arm 17 swings for a very trivial amount of angle toward the center of the disc 1 and develops an offset angle Δθ in the forward direction, this offset angle is detected by the offset angle detector 28–30, and an offset signal SO of the positive polarity is generated from the offset signal generating circuit 54. By this offset signal SO, the motor 13 is caused to make forward rotation. Whereupon, the movable frame or pickup arm supporting mechanism 9 is caused to move for a trifle distance toward the center of the disc 1 in such a manner that the offset angle developed by the pickup arm 17 is corrected back to substantially zero value.

Thus, if the disc 1 is 30 cm in diameter, the pickup arm 17 will, when it arrives at position B, i.e. at the end of the signal-carrying groove of the disc 1, tend to move rapidly toward the center of the disc 1 while being guided by that lead-out groove of the disc 1 having a suddenly broadened pitch which entails the end of the signal-carrying groove, causing a sudden increase in the offset angle of the pickup arm 17, whereby the offset signal generating circuit 54 will generate an offset signal SO of the positive polarity and of a large value. As a result, the output level of the servo amplifier 50 exceeds the pre-set value, and thereby the first switching circuit 58a of the signal groove end detecting circuit 58 is rendered conductive. Since, at such a time, the permanent magnet 27 of the movable frame 9 is in the position of facing the reed switch 26, this latter switch 26 is closed by the magnetic field of this permanent magnet 27, whereby the second switching circuit 58b of the signal groove end detecting circuit 58 is also rendered conductive. Accordingly, groove end detection signals S1 and S2 are generated from the signal groove end detecting circuit 58.

The lifter control circuit 56, upon its receipt of the groove end detection signal S2, is actuated to energize the arm lifter 23. Thus, this arm lifter 23 causes the pickup arm 17 to make an upward swinging movement about its fulcrum. After the groove end detection signal S1 has been delayed, by the delay circuit 55, until the pickup arm 17 has completed a sufficient upward swinging movement, the signal S1 is inputted to the quick return signal generating circuit 52. Whereupon this circuit 52 generates a quick return signal SF. This signal SF is amplified by the servo amplifier 50 and the amplified signal is applied to the motor 13. Thereby, the motor 13 is caused to make a reverse rotation at a high speed, so that the movable frame 9 is caused to move toward the arm rest at a high speed. Throughout the period of movement of the movable frame 9, the groove end detection signal S2 is continuously delivered from the signal groove end detecting circuit 58 to the lifter control circuit 56, thus continuing the energization of the arm lifter 23. Accordingly, the pickup arm 17 is kept in its lift-up position. And, the pickup arm 17 moves, together with the movable frame 9, while being held at right angle relative to both the first and the second guide rails 5 and 6 by the angle regulating member not shown. As such, during this period of movement, the offset signal SO is nil. When the pickup arm 17 reaches position A, the movable frame 9 is brought into contact with the actuator of the micro-switch 25, causing this micro-switch to close. Thereby, a reset signal S3 is generated from the reset circuit 57, causing both the quick return signal groove end detecting circuit 58 to be re-set. Thus, the delivery of the quick return signal SF and of the groove end detection signal S2 ceases, and the movable frame 9 comes to a halt. Along with this, the arm lifter 23 is de-energized, and the pickup arm 17 is lowered on the arm rest not shown. With this, the automatic quick return operation of the pickup arm 17 completes.

As stated above, in the pickup arm driving device of the present invention, it will be understood that, whenever the lead-out groove entailing the end of the signal-carrying groove, i.e. the completion of reproduction, is detected automatically, the arm lifter 23 is actuated first to lift the pickup arm 17 and then the movable frame 9 is caused to move. Thus, there arises no fear that the surface of the disc 1 is damaged by the stylus 21a of the pickup head 21.

In the above-mentioned embodiment, the signal groove end detecting circuit 58 is composed of the first and the second switching circuits 58a and 58b. Accordingly, it is possible to make unfailing detection of the end of the signal-carrying groove of the disc 1, i.e. the completion of reproduction. Thus, it will be understood that, from the viewpoint of principle of this invention, the signal groove end detecting circuit 58 may be constructed so as to detect the end of the signal-carrying groove by relying only on a sharp increase in the magnitude of the offset SO caused by the lead-out groove of the disc 1. This construction, however, is not free from the fear that the circuit could make an erroneous action in case there arises a sudden increase in the offset angle $\Delta\theta$ of the pickup arm 17 caused by a skipping of the stylus due to vibration of the disc 1 or injury on the surface of the disc. Alternatively, the signal groove end detecting circuit 58 may be constructed so as to detect the end of the signal-carrying groove by making use of the distance from the center of the disc 1. However, the distance from the center to the signal-carrying groove end of a disc of 30 cm in diameter is different from that of a disc of 17 cm in diameter. Thus, it will be necessary to provide some means to identify the size of the disc.

In contrast to these two kinds of conceivable arrangements of signal groove end detecting circuit, the one 58 according to the aforesaid embodiment of the present invention is of the construction that, only when the pickup arm 17 is located within the range of positions between position B inclusive and position C inclusive, i.e. only when the pickup arm 17 is located at a position closer to the center of the disc 1 than the position B inclusive corresponding to the end of the signal-carrying groove of the disc of 30 cm in diameter, the circuit 58 is enabled by the finished position detection means, including magnet 27 and reed switch 26 enabling switch 58b, to generate groove end signals S1 and S2 owing to an increase in the offset angle $\Delta\theta$. If the record finished position of the disc, e.g., the end of the signal-carrying groove of the disc, is not yet reached by the pickup arm and consequently reed switch 26 is still open so it cannot produce a finish position detection signal and hence the means (switch 58b) which couples it to the end detecting circuit 58 remains open, generation of signal groove end detection signals S1 and S2 is prevented. Thus, it is possible to detect, substantially unerringly, the end of the signal-carrying groove, regardless of the type of disc 1.

Figure 9:
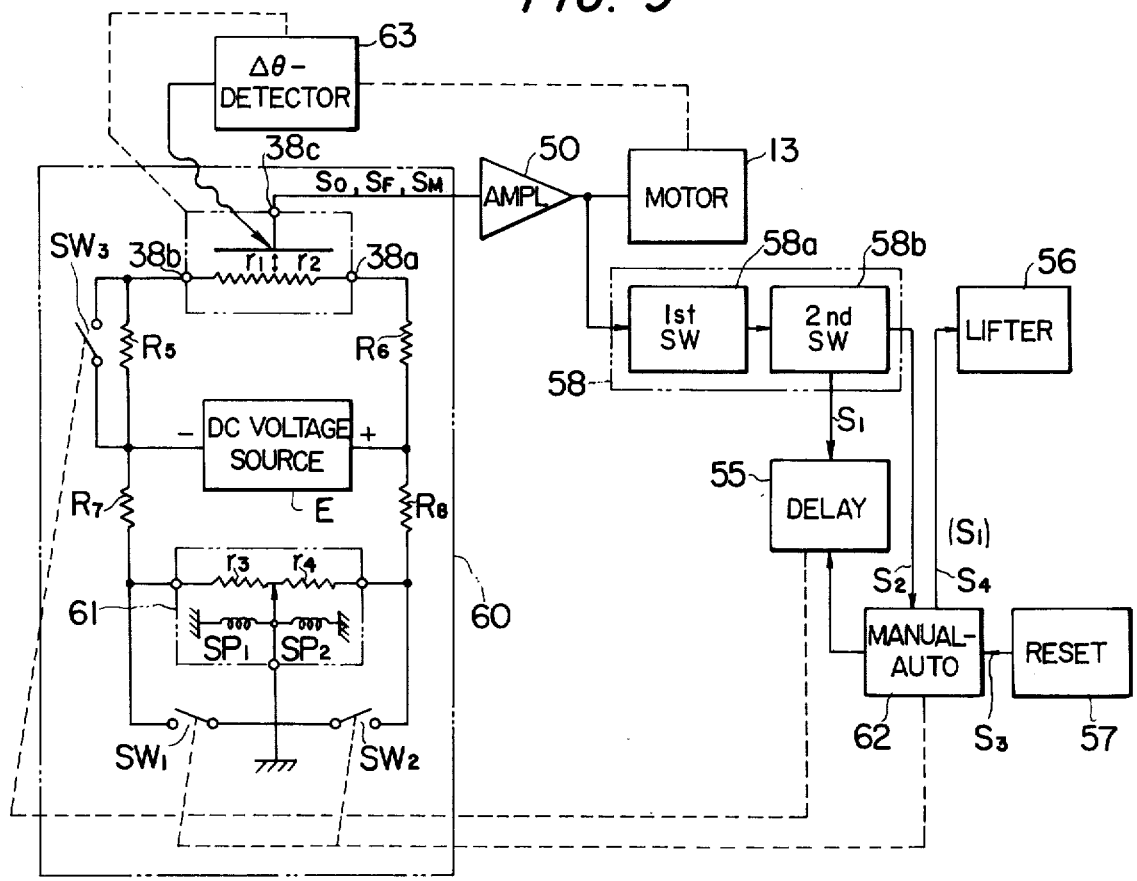
FIG. 9 is a block diagram showing another example of the circuitry of the pickup arm driving device of the present invention.

FIG. 9 shows another example of electrical circuit of the pickup arm driving device of the present invention. In this example, the functions of the offset signal generating circuit 54, the quick return signal generating circuit 52 and the manual control signal generating circuit 53 described in connection with the preceding example are carried out by a single bridge circuit 60. This bridge circuit 60 is comprised of: the above-mentioned photo-electricity converting element 29; resistors R5, R6, R7 and R8; a potentiometer 61; a direct current voltage source E and relay switches or contact SW1, SW2 and SW3. The potentiometer 61 is composed of resistance elements r3 and r4 which are coupled together serially, and a slider tap P which is capable of sliding while being in contact with these resistors (resistance elements) r3 and r4. The slider tap P is held, by a pair of spring means SP1 and SP2, at the point of junction of the resistors r3 and r4. The relay switches or contacts SW1 and SW2 are opened and closed by a manual-automatic mode changeover circuit 62. The relay switch or contact SW3 is opened and closed by the output of a delay circuit 55. Numeral 63 represents that region of the offset angle detector (refer to FIG. 5) excluding the photo-electricity converting element 29, i.e. it represents the light-emitting diode 28 and the slit-carrying plate 30 of the example shown in FIG. 5. Parts similar to those mentioned in the preceding example are indicated by like reference numerals and symbols.

Description will hereunder be made on the operation of the pickup arm driving device according to this example.

Now, let us first assume that the manual-automatic mode changeover circuit 62 is set to the automatic mode. Whereupon, the relay contacts SW1 and SW2 are closed, and the manual potentiometer 61 is substantially removed from the bridge circuit 60. Accordingly, it it is assumed that the resistance values of the resistors R5 and R6 are equal to the resistance values of the resistors R7 and R8, respectively, the output of the bridge circuit 60 depends solely on the ratio of resistance $r1/r2$ of the photo-electricity converting element 29. More specifically, in perfectly the same way as in the preceding example, the pickup arm 17 is automatically fed while its offset angle $\Delta\theta$ is held substantially zero, by the feedback control action exerted by the closed loop formed with: servo amplifier 50 — motor 13 — offset angle detector 63 — bridge circuit 60.

When the pickup arm 17 arrives at the end of the signal-carrying groove of the disc 1, there is generated groove end detection signals S1 and S2 from the signal groove end detecting circuit 58. The groove end detection signal S1 is immediately inputted to the lifter control circuit 56 via the manual-automatic mode changeover circuit 62. Whereupon, the arm lifter 23 is actuated and the pickup arm 17 is lifted upwardly and is held, by the angle regulating member, at right angle with the first and the second guide rails 5 and 6. Upon completion of the uplifting of the pickup arm 17, the relay contact SW3 is closed by the output of the delay circuit 55. Thus, the opposite terminals of the resistor R5 are short-circuited, causing the destruction of the balanced state of the bridge circuit 60, and as a result a large direct current voltage of negative polarity appears at the lead 38c of the photo-electricity converting element 29. This voltage, i.e. a quick return signal SF, causes the motor 13 to make a reverse rotation at a high speed. Thereby, a pickup arm 17 which is supported on the movable frame 9 is returned toward position A at a high speed, and when the pickup arm 17 arrives at a position A, the micro-switch 25 is closed, and the reset circuit 57 generates a reset signal S3. As a result, the manual-automatic mode changeover circuit 62 is re-set, and the relay contacts SW1 and SW2 are opened. Also, a reset signal is transmitted to the delay circuit 55 so that the relay contact SW3 is opened. At the same time, the arm lifter 23 is de-energized, and the pickup arm 17 is placed onto the arm rest not shown at position A.

In case it is intended to feed the pickup arm 17 in the manual mode, the manual-automatic mode changeover circuit 62 is set to the manual mode operation. Whereby, the relay contacts SW1, SW2 and SW3 are opened. Also, a lifter control signal is delivered to the lifter control circuit 56 from the manual-automatic mode changeover circuit 62, causing the arm lifter 23 to be actuated. Accordingly the ratio between the resistances, i.e. the resistors r1 and r2 of the photo-electricity converting element 29 will cease to vary. Thus, by arbitarily altering the balanced state of the bridge circuit 60 by slidably moving the slider tap P, it is possible to generate a manual control feed signal SM having a desired polarity and value. Upon ceasing the operation of the slider tap P, this tap P is automatically returned to the initial central position by the spring forces of the spring means SP1 and SP2. As a result, the bridge circuit 60 is rendered to the balanced state, so that the manual mode feed signal SM becomes nil. Thus, the pickup arm 17 is brought to a halt. It is to be understood that the resistors r3 and r4 of the potentiometer 61 are set to have the same resistance value.

It should also be understood that the relay switches SW1 – SW3 of the above example are not limited to those of the contact-to-contact type but that transistors or other suitable switching means may be employed.

As described above, according to this example, it is possible to generate an offset signal SO, i.e. automation mode feed signal, quick return signal SF and manual mode signal SM, by a single bridge circuit 60. Thus, the arrangement of the pickup arm driving device can be simplified. The pickup arm driving device according to the present invention is not limited to the arrangements of the above-discussed examples. It should be understood that the present invention is capable of adopting various modified forms of arrangement, other than those limited by the appending claims so long as they fall within such an extent as will not depart from the spirit and advantages of the present invention.

I claim:

1. A pickup arm driving device in a linear tracking pickup apparatus with a pickup arm traceable on a disc, comprising:

support means including a movable supporting mechanism for supporting the pickup arm for vertical as well as horizontal movements and permitting the pickup arm to make linear travel radially of a disc in a horizontal direction;

a motor designed so that its rotation speed and direction of rotation are determined by the value and the polarity of the voltage applied;

a motive power transmitting means for converting the rotation force of said motor to a linear movement force and transmitting the latter force to said movable supporting mechanism;

an offset angle detector for detecting a horizontal offset angle of the pickup arm;

an offset signal generating circuit associated with said offset angle detector for generating an offset signal having a variable value and polarity corresponding to the variable magnitude and direction of the offset angle detected;

an amplifier for receiving, as an input thereof, said offset signal and for driving said motor, by the output of this amplifier, to rotate in a direction corresponding to the direction of movement of said movable supporting mechanism in which the offset angle decreases;

a signal groove end detecting circuit for detecting the face that the pickup arm has arrived at the end position of the signal-carrying groove of the disc by detecting when the said value of said offset signal exceeds a predetermined level of magnitude for generating a groove end detection signal;

a finished position detecting means for detecting the arrival of the whole pickup arm into a required range of distance from the center of the disc to produce a finish position detection signal, and means coupling said position detecting means to said signal groove end detecting circuit for preventing generation of a signal groove end detection signal in the absence of a said finish position detection signal from said position detecting means.

2. A pickup arm driving device according to claim 1, further comprising:

an electrically driven arm lifter provided in said movable supporting mechanism for moving the pickup arm to and away from the disc;

a lifter control circuit; and a manual control signal generating circuit for generating, by manual operation, a lifter control signal and a manual control feed signal, said lifter control circuit, upon its receipt of said lifter control signal, driving the arm lifter, whereby the pickup arm is moved away from the disc, said amplifier, upon its receipt of said manual control feed signal, driving by its output said motor at a rotation speed and in a direction of rotation corresponding to the value and the polarity, respectively, of said manual control feed signal.

3. A pickup arm driving device according to claim 1, in which:

said offset angle detector comprises an angle-optical converting means for converting any horizontal offset angle of the pickup arm to an optical variation, and a photo electricity converting element for converting the optical variation to an electrical amount.

4. A pickup arm driving device according to claim 3, in which:

said photo-electricity converting element comprises: a resistor, a first and a second lead extending from the opposite ends of said resistor; an electroconductive electrode provided to face said resistor and electrically contacting said resistor via a photoconductor having the characteristic that its conductivity increases when exposed to light rays; and a third lead extending from said electrode, and in which:

said angle-optical converting means comprises: a light-emitting source; a slit-carrying plate having a slit for passing therethrough a beam-like light rays the light emitting from the light-emitting source and being mechanically coupled to the pickup arm for moving in correspondence with the offset angle of the pickup arm, and in which:

the position at which the beam-like light rays which have passed through said slit impinge onto the photoconductr of the photo-electricity converting element moves between the opposite ends of said resistor in accordance with the variation of said offset angle.

5. A pickup arm driving device according to claim 4, in which:

said offset signal generating circuit comprises: a bridge circuit formed with said resistor of said photo-electricity converting element and at least two resistors, and a direct current voltage source coupled to said bridge circuit, and in which:

said offset signal is derived from said third lead of the photo-electricity converting element.

6. A pickup arm driving device according to claim 1, in which:

said movable supporting mechanism comprises: a movable frame having rotatable rollers; a supporting mechanism for allowing the pickup arm to freely make horizontal as well as vertical swinging movement, on said movable frame; and guide rails provided in parallel with a radial direction of the disc, said movable frame being supported on said guide rails by said rotatable rollers for free movement radially of the disc, and in which:

said motive force transmitting means comprises: pulley provided on one end of said guide rails and rotatable jointly with the rotary shaft of said motor; a second pulley rotatably provided at a position of the other end of said guide rails so as to face said first pulley; and a belt applied between said first and second pulleys and coupled, intermediately thereof, to said movable frame.

7. A pickup arm driving device in a linear tracking pickup apparatus with a pickup arm traceable on a disc, comprising:

support means including a movable supporting mechanism for supporting the pickup arm for vertical as well as horizontal movements and permitting the pickup arm to make linear travel radially of a disc in a horizontal direction;

a motor designed so that its rotation speed and direction of rotation are determined by the value and the polarity of the voltage applied;

a motive power transmitting means for converting the rotation force of said motor to a linear movement force and transmitting the latter force to said movable supporting mechanism;

an offset angle detector for detecting a horizontal offset angle of the pickup arm;

an offset signal generating circuit associated with said offset angle detector for generating an offset signal having a value and polarity corresponding to the magnitude and direction of the offset angle detected;

an amplifier for receiving, as an input thereof, said offset signal and for driving said motor, by the output of this amplifier, to rotate in a direction corresponding to the direction of movement of said movable supporting mechanism in which the offset angle decreases;

a signal groove end detecting circuit for detecting the fact that the pickup arm has arrived at the end position of the signal-carrying groove of the disc by detecting when the said value of said offset signal exceeds a predetermined level of magnitude for generating a groove end detection signal;

an electrically-controlled arm lifter provided in said movable supporting mechanism for moving the pickup arm to and away from the disc; and a lifter control circuit coupled to said arm lifter and to said signal groove end detecting circuit to receive said groove end detection signal to drive said arm lifter in a direction that the pickup arm moves away from the surface of the disc.

8. A pickup arm driving device according to claim 7, further comprising:

a quick return signal generating circuit;
a delay circuit; and
a reset circuit for generating a reset signal when the pickup arm is at an arm rest position, and arranged so that said quick return signal generating circuit delivers to said amplifier a quick return signal whenever this circuit receives said groove end detection signal delayed by said delay circuit, said quick return signal being an electric signal having a value and a polarity enough for the amplifier to generate an output necessary for rotating said motor at a high speed in a direction in which said movable supporting mechanism is driven to move the pickup arm at a toward the arm rest position at a speed substantially higher than said motor drives said pickup arm supporting mechanism away from said rest position, said quick return signal generating circuit ceasing the generation of said quick return signal upon its receipt of said reset signal, said signal groove end detecting circuit ceasing the generation of said groove end detection signal upon its receipt of said reset signal.

9. A pickup arm driving device according to claim 7, further comprising:

a position detecting means for detecting the arrival of the pickup arm from the center of the disc into a required range of distance, said signal groove end detecting circuit including means preventing generation of a signal groove detection signal at the absence of a detection signal from said position detecting means.

10. A pickup arm driving device according to claim 7, in which:

the signal which varies in its level in association with said offset signal is an output signal of said amplifier.

11. A pickup arm driving device in a linear tracking pickup apparatus with a pickup arm traceable on a disc, comprising:

support means including a movable supporting mechanism for supporting the pickup arm for vertical as well as horizontal movements and permitting the pickup arm to make linear travel radially of a disc in a horizontal direction;

a motor designed so that its rotation speed and direction of rotation are determined by the value and the polarity of the voltage applied;

a motive power transmitting means for converting the rotation force of said motor to a linear movement force and transmitting the latter force to said movable supporting mechanism;

an offset angle detector for detecting a horizontal offset angle of the pickup arm;

an offset signal generating circuit associated with said offset angle detector for generating an offset signal having a value and polarity corresponding to the magnitude and direction of the offset angle detected;

an amplifier for receiving, as an input thereof, said offset signal and for driving said motor, by the output of this amplifier, to rotate in a direction corresponding to the direction of movement of said movable supporting mechanism in which the offset angle increases;

an electrically driven arm lifter provided in said movable supporting mechanism for moving the pickup arm to and away from the disc;

a lifter control circuit;

a manual control signal generating circuit for generating, by manual operation, a lifter control signal and a manual control feed signal, said lifter control circuit, upon its receipt of said lifter control signal, driving the arm lifter, whereby the pickup arm is moved away from the disc, said amplifier, upon its receipt of said manual control feed signal, driving by its output said motor at a rotation speed and in a direction of rotation corresponding to the value and the polarity, respectively, of said manual control feed signal; and a signal-carrying groove end detecting circuit for detecting the arrival of the pickup arm at the signal-carrying groove end of the disc by detecting when the said value of said offset signal exceeds a predetermined level of magnitude for generating a groove end detection signal, said lifter control circuit, upon its receipt of said groove end detection signal via said manual-automatic mode changeover circuits, driving said arm lifter.

12. A pickup arm driving device according to claim 11, further comprising:
a quick return signal generating circuit;
a delay circuit; and
a reset circuit for generating a reset signal when the pickup arm is at arm rest position,
said quick return signal generating circuit, upon its receipt of the groove end detection signal after being delayed by said delay circuit, delivering a quick return signal to said amplifier,
said quick return signal being an electrical signal having a value and a polarity enough for said amplifier to generate an output necessary for rotating said motor at a high speed in a direction in which said movable supporting mechanism is driven to move the pickup arm at a high speed toward the arm rest position,
said quick return signal generating circuit ceasing the generation of said quick return signal upon its receipt of said reset signal,
said signal groove end detecting circuit generating said groove end signal upon its receipt of said reset signal.

13. A pickup arm driving device in a linear tracking pickup apparatus with a pickup arm traceable on a disc, comprising:
support means including a movable supporting mechanism for supporting the pickup arm for vertical as well as horizontal movements and permitting the pickup arm to make linear travel radially of a disc in a horizontal direction;
a motor designed so that its rotation speed and direction of rotation are determined by the value and the polarity of the voltage applied;
a motive power transmitting means for converting the rotation force of said motor to a linear movement force and transmitting the latter force to said movable supporting mechanism;
an offset angle detector for detecting a horizontal offset angle of the pickup arm;
an offset signal generating circuit associated with said offset angle detector for generating an offset signal having a value and polarity corresponding to the magnitude and direction of the offset angle detected;
an amplifier for receiving, as an input thereof, said offset signal and for driving said motor, by the output of this amplifier, to rotate in a direction corresponding to the direction of movement of said movable supporting mechanism in which the offset angle decreases;

a signal groove end detecting circuit for detecting the fact that the pickup arm has arrived at the end position of the signal-carrying groove of the disc by detecting when the said value of said offset signal exceeds a predetermined level of magnitude for generating a groove end detection signal;

an electrically-controlled arm lifter provided in said movable supporting mechanism for moving the pickup arm to and away from the disc;

a lifter control circuit coupled to said arm lifter and to said signal groove end detecting circuit to receive said groove end detection signal to drive said arm lifter in a direction that the pickup arm moves away from the surface of the disc; and a position detecting means for detecting the arrival of the pickup arm from the center of the disc into a required range of distance, said signal groove end detecting circuit including means for preventing generation of a signal groove detection signal in the absence of a detection signal from said position detecting means;

said position detecting means comprising a permanent magnet provided on that portion of said movable supporting mechanism which is adapted to move together with the pickup arm, and a magnetically sensitive switch adapted to be closed and opened by the magnetic field of said permanent magnet when the pickup arm is within said required range of distance.

14. A pickup arm driving device according to claim 13 wherein said magnetically sensitive switch is a reed switch.

15. A pickup arm driving device in a linear tracking pickup apparatus with a pickup arm traceable on a disc, comprising:
support means including a movable supporting mechanism for supporting the pickup arm for vertical as well as horizontal movements and permitting the pickup arm to make linear travel radially of a disc in a horizontal direction;
a motor designed so that its rotation speed and direction of rotation are determined by the value and the polarity of the voltage applied;
a motive power transmitting means for converting the rotation force of said motor to a linear movement force and transmitting the latter force to said movable supporting mechanism;
an offset angle detector for detecting a horizontal offset angle of the pickup arm;
an offset signal generating circuit associated with said offset angle detector for generating an offset signal having a value and polarity corresponding to the magnitude and direction of the offset angle detected;
an amplifier for receiving, as an input thereof, said offset signal and for driving said motor, by the output of this amplifier, to rotate in a direction corresponding to the direction of movement of said movable supporting mechanism in which the offset angle decreases;
an electrically driven arm lifter provided in said movable supporting mechanism for moving the pickup arm to and away from the disc;
a lifter control circuit;

a manual control signal generating circuit for generating, by manual operation, a lifter control signal and a manual control feed signal, said lifter control circuit, upon its receipt of said lifter control signal, driving the arm lifter, whereby the pickup arm is moved away from the disc, said amplifier, upon its receipt of said manual control feed signal, driving by its output said motor at a rotation speed and in a direction of rotation corresponding to the value and the polarity, respectively, of said manual control feed signal;

in which said offset angle detector comprises: a photo-electricity converting element comprised of:

a resistor;

a first and a second lead extending from the opposite ends of said resistor;

an electroconductive electrode provided to face said resistor and electrically contacting said resistor via a photoconductor having the characteristic that its conductivity increases when exposed to light rays;

a third lead extending from said electrode, a light-emitting source, and a slit-carrying plate having a slit for passing therethrough as beam-like light rays the light rays emitting from said light-emitting source and mechanically coupled to the pickup arm for moving in correspondence with the offset angle of the pickup arm, the position at which the beam-like light rays having passed through said slit impinge onto the photoconductor of the photo-electricity converting element moving between the opposite ends of said resistor in accordance with the variation of the offset angle, and in which:

the offset signal generating circuit and said manual control signal generating circuit both are comprised of a common bridge circuit and a direct current voltage source connected to this bridge circuit, said manual control signal generating circuit further comprising a manual-automatic mode changeover circuit, said bridge circuit comprising said resistor of said photo-electricity converting element and a manually operable potentiometer having a slider tap, the non-balanced output of said bridge circuit which appears in correspondence with that position on said photoconductor of the photo-electricity converting element onto which the beam-like light rays impinge being inputted to said amplifier as said offset signal, the non-balanced output of said bridge circuit which appears in correspondence with that position assumed by the slider tap of said potentiometer being inputted to said amplifier as said manual control feed signal, said manual-automatic mode changeover circuit generating said lifter control signal when it is set to the manual operation mode.

16. A pickup arm driving device according to claim 15, further comprising:

a signal groove end detecting circuit for detecting the arrival of the pickup arm at the signal-carrying groove end position of the disc by detecting when the said value of said offset signal exceeds a predetermined level of magnitude for generating a groove end detection signal, said lifter control circuit driving said arm lifter when it receives said groove end detection signal.

17. A pickup arm driving device according to claim 16, further comprising:

a first relay;

a delay circuit to which said groove end detection signal is inputted; and a reset circuit for generating a reset signal when the pickup arm is at an arm rest position, the contact of said first relay being connected to said bridge circuit, said relay contact being closed or opened by the delayed output of said delay circuit when the latter circuit receives said groove end detection signal, thereby destroying the balanced state of said bridge circuit, whereby the resulting non-balanced output of said bridge circuit is inputted to said amplifier as a quick return signal, said delay circuit opening or closing said relay contact when it receives said reset signal, whereby said bridge circuit becomes balanced and the generation of said quick return signal ceases, said quick return signal being an electrical signal having a value and a polarity enough for said amplifier to generate an output necessary for causing said motor to make a high speed rotation in a direction in which said movable supporting mechanism is driven to effect a high speed feed of the pickup arm toward the arm rest position.

18. A pickup arm driving device according to claim 15, in which:

said potentiometer has spring means, the slider tap of said potentiometer, when this tap is not manually operated, being held by the spring force of said spring means at a position in which said bridge circuit is balanced when said offset angle is zero.

* * * * *